(12) United States Patent
Duff et al.

(10) Patent No.: US 9,861,976 B2
(45) Date of Patent: Jan. 9, 2018

(54) REGENERATION OF OXIDATIVE DEHYDROGENATION CATALYST IN A REACTOR

(71) Applicant: TPC Group LLC, Houston, TX (US)

(72) Inventors: Joseph G. Duff, League City, TX (US); Jillian M. Horn, Decatur, GA (US)

(73) Assignee: TPC Group LLC, Houston, TX (US)

( * ) Notice: Subject to any disclaimer, the term of this patent is extended or adjusted under 35 U.S.C. 154(b) by 0 days.

(21) Appl. No.: 15/446,076

(22) Filed: Mar. 1, 2017

(65) Prior Publication Data

US 2017/0252738 A1    Sep. 7, 2017

Related U.S. Application Data

(60) Provisional application No. 62/301,747, filed on Mar. 1, 2016.

(51) Int. Cl.
*B01J 38/04* (2006.01)
*B01J 23/94* (2006.01)

(52) U.S. Cl.
CPC .............. *B01J 38/04* (2013.01); *B01J 23/94* (2013.01)

(58) Field of Classification Search
CPC .................................. B01J 38/04; B01J 23/94
USPC ......................................................... 502/56
See application file for complete search history.

(56) References Cited

U.S. PATENT DOCUMENTS

| | | | |
|---|---|---|---|
| 3,595,809 A | 7/1971 | Kehl | |
| 3,595,810 A | 7/1971 | Kehl | |
| 3,669,877 A | 6/1972 | Fredrich | |
| 4,044,067 A | 8/1977 | Besozzi et al. | |
| 2010/0248942 A1 | 9/2010 | Xu et al. | |
| 2012/0164048 A1 | 6/2012 | Duff et al. | |
| 2014/0163292 A1 | 6/2014 | Grune et al. | |

FOREIGN PATENT DOCUMENTS

| | | |
|---|---|---|
| CN | 103071430 | 5/2013 |
| CN | 103071544 | 5/2013 |
| CN | 104226334 | 12/2014 |
| WO | 2014086815 | 6/2014 |

*Primary Examiner* — Edward Johnson
(74) *Attorney, Agent, or Firm* — M. Susan Spiering; Ferrells, PLLC

(57) ABSTRACT

Disclosed herein is a process for the regeneration of oxidative dehydrogenation (OXO-D) catalyst in an alternate or separate regeneration reactor by employing controlled steam:air and time/pressure/temperature conditions. The process avoids destruction of the catalyst, and wear/tear on an OXO-D reactor. The regenerated catalyst is an iron based oxide catalyst which can be zinc or zinc-free. The iron based oxide catalyst is regenerated in the regeneration reactor by feeding an air/steam stream over a set amount of time, preferably about 6 days to yield a regenerated OXO-D catalyst. The regenerated catalyst is activated and re-utilized to produce butadienes.

20 Claims, 2 Drawing Sheets

REGENERATION OF OXIDATIVE DEHYDROGENATION CATALYST IN A REACTOR

CROSS REFERENCE TO RELATED APPLICATION(S)

This is a non-provisional patent application based on U.S. Provisional Patent Application Ser. No. 62/301,747 previously titled "Regeneration of Oxidative Dehydrogenation Catalyst in a Reactor", filed on Mar. 1, 2016, the priority of which is hereby claimed and the disclosure of which is incorporated herein by reference in its entirety.

BACKGROUND

Field of the Invention

The present invention relates to a process for regeneration of oxidative dehydrogenation (OXO-D) catalyst in a reactor. More particularly, the present invention relates to a process for regeneration of iron-based oxide catalyst in a reactor.

Description of the Related Art

Butadiene, commonly known as 1,3-butadiene, is used as a monomer in the production of synthetic rubber. Butadiene is a basic petrochemical raw material used for several industrial applications including tire and polymer industry. Although, there are numerous methods to produce and obtain butadiene, oxidative dehydrogenation (OXO-D) reaction of butene is the most efficient process to produce butadiene. Butadiene is obtained by oxidative dehydrogenation of n-butenes (1-butene and/or 2-butene) and any mixture comprising n-butenes can be used as starting gas mixture.

The use of multi-metal oxide catalyst in OXO-D reaction enhances the productivity, selectivity and conversion ratio of butadiene. A wide range of catalysts such as oxides of molybdenum, vanadium, cobalt, zinc, and the like, have been used to alter OXO-D reaction. However, most of these catalysts exhibit problems such as low selectivity, stringent operating conditions, high energy consumption and the like. Of all the catalysts, iron based oxide catalysts were identified to have advantages, such as higher butadiene yield and lower oxidation byproducts. Therefore, iron based oxide catalysts are most widely used in the oxidative dehydrogenation (OXO-D) reaction.

In the oxidative dehydrogenation of n-butenes to butadiene, a carbonaceous material can be formed on the multi-metal oxide catalyst, and which can ultimately lead to its deactivation. The multi-metal oxide catalyst is regenerated by burning off the deposited carbon at regular intervals by means of an oxygen-comprising gas in order to restore the activity of the catalyst. However, there is wide difference in the operating and regenerating conditions of OXO-D reaction and the catalyst, respectively. For example, temperature required for regeneration of the catalyst is higher than temperature required for operating conditions of the OXO-D reaction. In order to sustain the variation in temperatures over a period of time, the reactor has to adjust frequently to re-equilibrate thereby leading to inefficient usage of the reactor. Moreover, the temperatures above reaction conditions wear the reactor and also burn excess saturated carbonaceous compounds, which may also result in charring and destruction of the catalyst.

Relative to regeneration of the catalyst, much is written about regeneration of catalyst for an OXO-D process wherein the reactor is a fluidized bed or a single reactor is employed in-situ. Also, much of what is written is directed towards Mo Bi catalyst and not as much to ZnFe catalyst where it has been found that regeneration conditions are critical to avoid charring. References do not appear to take into consideration the sensitivity of the ZnFe based oxide catalyst to temperature and the need to protect the catalyst during the regeneration process.

U.S. Pat. No. 3,595,809 to Kehl discloses regeneration of a lanthanum chromium ferrite catalyst composition wherein the catalyst is calcined in air at 500° C. to 650° C.

U.S. Pat. No. 3,595,810 to Kehl discloses a zinc chromium ferrite catalyst of a spinel structure having a distinct crystalline structure which can be regenerated in a single reactor. Regeneration occurs in air at about 500-650 C. See col 4, example 1, however, note that chromium makes a catalyst behave differently than a zinc ferrite due to its different structural, surficial and chemical interactions or bonds.

U.S. Pat. No. 3,669,877 to Friedrich discusses a multi-chamber fluidized bed catalytic reactor where the ferrite catalyst comprising crystalline composition of iron, oxygen and other metals are regenerated in the same reactor as the OXO-D reaction of the n-butene to butadiene.

U.S. Pat. No. 4,044,067 to Besozzi et al. discloses a purification of unsaturated compounds, or removal of oxygenated compounds on the preferred ZnFe catalyst, by passage of air or steam to remove coke deposits on the catalyst. Minimal details are provided regarding the regeneration process (see col 6 1 28).

US 2010/0248942 to China Petroleum and Chemical Corporation discusses regeneration of catalyst for improving performance and selectivity in a cracking process involving transfer of the catalyst to a separate regeneration reactor, and the regeneration times are less than 30 minutes.

US 2012/0164048 to Duff et al disclose a zinc-free catalyst system and a process for the selective removal of acetylenic compounds from a butadiene production stream. Para 0024 discloses that the catalyst can be regenerated by controlled oxidation with or without steam in the absence of hydrocarbons. The process disclosed is generic with no parameters provided for the actual regeneration conditions.

US 2014/0163292 to Gruene et al disclose a process for the oxidative dehydrogenation of n-butenes to butadiene and a regeneration step of the molybdenum cobalt catalyst employed. However, while it is disclosed that 5 cycles of production and regeneration are employed, minimal details are provided for the regeneration step. It appears the regeneration occurs in a 15-30 minute process of passing an oxygen/nitrogen/water mixture over the catalyst.

Various Chinese publications disclose regeneration of an OXO-D iron based oxide catalyst, but do not provide details regarding the process:

CN 103071430 discusses radial fixed bed reactor for production of butadiene using a ferrite catalyst, wherein a regeneration process was employed at a cycle of 3, 9, 10, 12, and 14 months.

CN 103071544 discusses an in-situ regeneration method for OXO-D catalyst of ZnFe and MoBi.

CN 104226334 discusses regeneration of an OXO-D catalyst for production of butadiene wherein the catalyst is based on ZeFe or MoBi spinel composite oxide structure. An oxygen/steam mixture is passed over the catalyst. The regeneration method discusses a two stage process where oxygen/steam mixture is passed over the catalyst at 460° C. for 24-72 hours, to regenerate the catalyst efficiently. However, the production and regeneration take place in a single reactor and the reactor is exposed to extreme temperatures over a period of time, thereby leading to wear and less productivity of the reactor.

WO 2014/086815 discusses a method for the oxidative dehydrogenation of n-butene to butadiene. The reference discloses a regeneration step and the use of molybdenum catalyst in a fixed bed reactor. The regeneration occurs between production steps and utilizes oxygen gas passed over the catalyst at a temperature of at least 350° C. and at least 50° C. above the temperature of the prior production step. This requires the reactor be heated for the regeneration step, and then subsequently cooled for the following production step.

There is a need to develop a method, which provides successful regeneration of the catalyst at lower temperatures. Therefore, a need exists for a process which regenerates a catalyst and yet maintains the efficiency and productivity of the reactor. Also, there exists a need to utilize a multi-stage reactor with a spare reactor to regenerate catalyst off-line, in order to reduce non-production times.

SUMMARY

An object of the present invention is to provide a method for regenerating oxidative dehydrogenation (OXO-D) catalyst in an alternate or separate regeneration reactor. The method involves usage of at least two, preferably three reactors where at least two reactors are continuously online (defined to mean are operational continuously or all the time) and one reactor is offline. The two reactors that are online are utilized as conversion reactors and the reactor that is offline is utilized as a regeneration reactor, where spent OXO-D catalyst is regenerated. Spent herein is defined to mean catalyst which has been previously used, is now considered exhausted or deactivated, and not efficient to use for reaction purposes. The regenerated catalyst is not physically moved to the online reactor, but the reactor having the regenerated catalyst is now converted to a conversion reactor for production of butadienes. And the new offline reactor readied for regeneration of the spent catalyst within that respective reactor.

The offline reactor will hereafter be referred to as the regeneration reactor. This can also be considered the alternate reactor, or second, or third, etc. reactor. In the regeneration reactor, the OXO-D catalyst has a carbonaceous compound deposited on the spent catalyst, and is treated at a pressure range of about 0-150 psig and a temperature range of about 340-650° C. In the conversion reactors, n-butene undergoes an oxidative dehydrogenation reaction and is converted to butadienes using the catalyst. After the complete conversion of n-butene to butadienes, optionally, one of the conversion reactors can be turned offline to regenerate the catalyst. However, it is preferred to have an alternate reactor already offline for use as the regeneration reactor. The regenerated catalyst is reutilized in the conversion process. An oxygen-containing gas mixture utilized in the regeneration contains a combination of at least one of steam, hydrocarbons, hydrogen or natural gases. The catalyst regenerated is an iron based oxide catalyst. The catalyst can be with or without zinc metal as a component.

The lifetime of the catalyst is enhanced by carrying out the regeneration at controlled heating over a slow period of time. The regeneration of the OXO-D catalyst using at least two, preferably 3 reactor beds is unique. The multi-stage process with an additional reactor provides an opportunity to regenerate catalyst offline thereby reducing non-production time. The catalyst is regenerated in the separate regeneration reactor; therefore, the additional wear on a reactor can be avoided, and enhance the reactor's lifetime. While the discussion herein focuses on use of 2 reactors, those of skill in the art will see that the number of reactors is irrelevant provided at least 2 exist so as one can be dedicated to the regeneration process.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION

Figure 1:
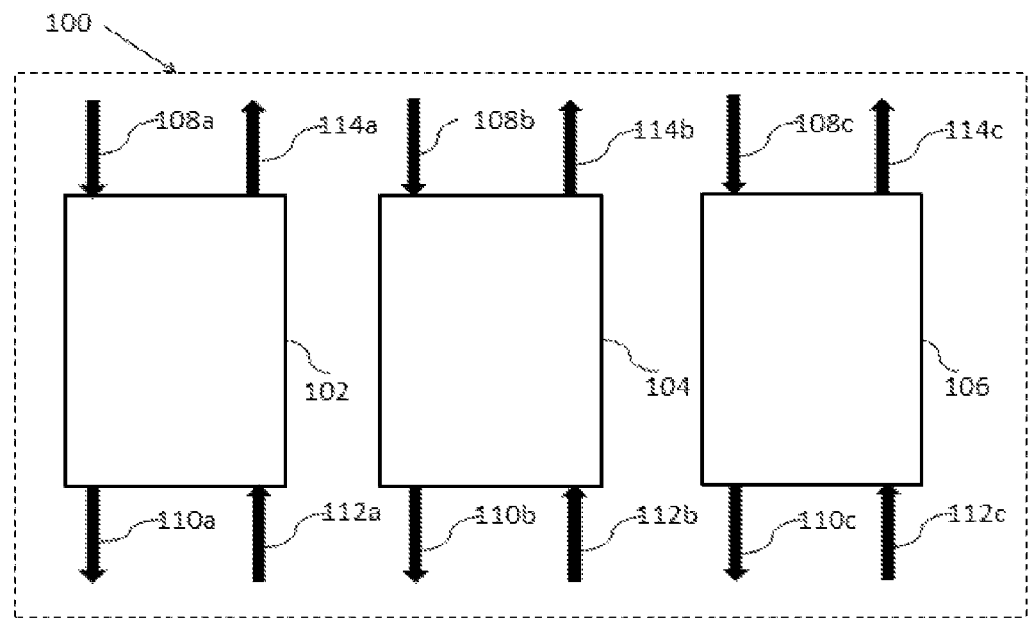
FIG. 1 represents a schematic illustration of process for regeneration of oxidative dehydrogenation (OXO-D) catalyst.

As used in the specification, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of process components which constitutes a process for regenerating oxidative dehydrogenation (OXO-D) catalyst, in accordance with an embodiment of the present invention. Accordingly, the components and the process steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, and as a representative basis for teaching one skilled in the art to variously employ the present invention in virtually any appropriately detailed structure. Further, the terms and phrases used herein are not intended to be limiting but rather to provide an understandable description of the invention.

A conversion or a production reactor is a reactor, in which n-butene undergoes oxidative dehydrogenation (OXO-D) reaction to form butadiene. The continuous operation of the conversion or production reactor results in deactivation of the OXO-D catalyst. The deactivated OXO-D catalyst is known as spent catalyst. A reactor where the spent catalyst regenerates is called a regeneration reactor. The disclosed regeneration process 100 is not a normal (here to date) process. It has been found that if the temperature is above 1500° F., the OXO-D catalyst is damaged. Hence, in the regeneration reactor, a temperature of less than 1500° F. is maintained, preferably about or less than 1300° F., and more preferably less than 1100° F. When a single reactor is being utilized for both the OXO-D reaction and the regeneration of catalyst, it is found that going offline to use the reactor for regeneration usually results in loss of catalyst yield and is time-inefficient for the production process of butadiene. Here, the term "online" refers to a continuous operation condition of a reactor and the term "offline" refers to non-operation condition of the reactor. For purposes of the present invention, the production or conversion reactor is online and the regeneration reactor is offline, at all times.

Disclosed herein is a process for regenerating an iron-based spent oxidative dehydrogenation catalyst in a fixed bed reactor, the process comprising passing a stream containing steam and air in a controlled fashion, together with an oxygen-containing gaseous mixture having $O_2$ to HC ratio is in the range of 0.2-1, and the steam to HC ratio is in the range of 10-15 over a spent iron-based oxidative dehydrogenation catalyst containing carbonaceous compounds in the fixed bed reactor; wherein the steam to air ratio is less than 20 moles; and, heating the carbonaceous compounds deposited on the spent iron-based oxidative dehydrogenation catalyst at a pressure of 0-150 psig and a temperature less than 705° C., (1300° F.), wherein the temperature is maintained substantially constant for a period less than 144 hours (6 days) in the fixed bed reactor, and thereby regenerating the spent iron-based oxidative dehydrogenation catalyst in the fixed bed reactor.

The process 100 for regeneration of the oxidative dehydrogenation (OXO-D) catalyst is shown in FIG. 1. The OXO-D catalyst is an iron-based oxide catalyst. As shown in FIG. 1, to achieve continuous operation, the process 100 uses first, second, and third reactors 102, 104, and 106, respectively. In an embodiment, the first, second and third reactors 102, 104, and 106, respectively are connected and operated in parallel. Each of the first, second, and third reactors 102, 104, and 106, respectively is used as either a conversion reactor or a regeneration reactor. The first, second, and third reactors 102, 104, and 106 have reactant streams 108a, 108b, and 108c, product streams 110a, 110b, and 110c, gaseous streams 112a, 112b, and 112c, and vent-out streams 114a, 114b, and 114c, respectively. In a preferred embodiment, at least two of the reactors are online continuously.

In an example, the first and second reactors 102 and 104, respectively are online and the third reactor 106 is offline. Here, the first and second reactors 102 and 104, respectively are conversion reactors and the third reactor 106 is a regeneration reactor. The first and second reactors 102 and 104, respectively are operated until the catalyst in each of them is deactivated by carbonaceous compounds. At the same time, catalyst in the third reactor 106 is regenerated.

In each of the first and the second reactors 102 and 104, there is a catalyst bed, preferably a fixed catalyst bed. In an embodiment, the catalyst bed may be a fluidized bed, and operated in a batch, semi-batch, or continuous process. In the present application, a reactant such as n-butene is fed into the first and second reactors 102 and 104 through the reactant streams 108a and 108b, respectively. The n-butene undergoes oxidative dehydrogenation (OXO-D) to form butadiene. The oxidative dehydrogenation (OXO-D) reaction is carried out at high temperatures in the presence of a catalyst in a fixed bed reactor. The catalyst is known as the oxidative dehydrogenation catalyst and is usually an iron-based oxide composite. The iron based oxide composite may include at least one of Mg, Zn, Ni, Co, Mn, Cu, Cd, Ca, Ba, Sr, Al, Cr, Ti, V, Mo, W, Na, Li, K, Zr, Ag, Sn, Pb, Sb, Bi, Ga, Ce, or La. In a preferred embodiment, the catalyst is zinc ferrite. In another embodiment, the catalyst may be iron-based oxide free of zinc (or a zinc-free catalyst). Hereinafter, the terms catalyst and the oxidative dehydrogenation (OXO-D) catalyst are used interchangeably.

The formed butadienes are extracted from the first and the second reactors 102 and 104 through the product streams 110a and 110b, respectively. In an embodiment, the product streams 110a and 110b may be used as vent-out streams for gaseous components. In an embodiment, selectivity of the product obtained in each of the first and second reactors 102 and 104, respectively is 92-94% and conversion about 60-65%. The reaction results in accumulation of carbonaceous compounds on the catalyst particle surface. As long as the oxidative dehydrogenation reaction proceeds, the carbonaceous compound will not terminate. In an embodiment, the carbonaceous compound may be coke, charcoal, soot and the like. The catalyst that is deactivated in the first and second reactors 102 and 104 is called spent catalyst.

In the third reactor 106, herein the regeneration reactor, the deactivated catalyst is regenerated by a stream of oxygen-containing gaseous mixture. The stream of oxygen-containing gaseous mixture is passed into the third reactor 106 through the gaseous stream 112c. The oxygen-containing gaseous mixture may be a combination of oxygen with steam, hydrogen, hydrocarbons (HC), natural gases, and the like. The oxygen-containing gaseous mixture heats the carbonaceous compounds deposited on the catalyst. The catalyst in the third reactor 106 is slowly heated to achieve a desired temperature of 1100° F. In an embodiment, the catalyst is slowly heated over 6 days or approximately 144 hours. The temperature in the third reactor 106 is initially maintained lower than the temperature required during OXO-D reaction, preferably maintained below 1300° F., and more preferably in the range of about 500-650° C., as large temperature gradient has an adverse impact on the catalyst performance. Further, the pressure is maintained in the range of about 0-150 psig.

The oxygen reacts with a layer of the carbonaceous compounds to release carbon dioxide ($CO_2$) gas, which is vented out through the vent-out stream 114c. The evolution of $CO_2$ gas is due to the combustion of the carbonaceous compounds. Moreover, the oxygen contacts the depleted catalyst and regenerates the catalyst by oxidation. The $CO_2$ gas released is then retrieved through the vent-out stream 114c. The retrieved $CO_2$ gas is used in the analysis of complete burn-out of the catalyst. In an embodiment, the analysis may be carried out using Gas Chromatography (GC) and other similar technologies. In another embodiment, the vent-out stream 114c, may be used to vent other excess gases such as steam, $O_2$, hydrocarbons, hydrogen, natural gases and the like.

In an embodiment, steam may also be present in the gas mixture to remove the heat of reaction. The proportion of the steam can be increased during the course of the regeneration process. When the maximum temperature begins to drop, the steam is slowly removed. The combination of gases used in the regeneration may comprise HCs which may be mixed in addition to, or instead, of the inert gases. In an embodiment, the proportion by volume of HC in the $O_2$-containing gas mixture is generally in the range of about 2-50%. In another embodiment, the HCs may comprise saturated and unsaturated, branched and unbranched hydrocarbons, such as methane, ethane, ethene, acetylene, propane, propene, propyne, n-butane, isobutane, n-butene, isobutene, n-pentane and also dienes such as 1,3-butadiene and 1,2-butadiene. More specifically, the gas mixture may comprise hydrocarbons which are unreactive in the presence of $O_2$. The regenerated catalyst in the third reactor 106 is retained and reused.

At this point, the catalyst in the third reactor 106 is regenerated and ready to further use. In an embodiment, more than 90% of the catalyst is regenerated. Further, the catalyst is activated prior to its exposure to OXO-D reaction by reducing the catalyst with either of hydrogen gas or natural gas. The catalyst in one of the first and second reactors 102 and 104 is deactivated by carbonaceous compounds. Subsequently, one of the first and second reactors 102 and 104 becomes offline and the third reactor 106 becomes online. Therefore, a continuous operation is achieved by the use of the first, second, and third reactors 102, 104, and 106, respectively. In an embodiment, the first reactor 102 may also turn offline. Further, the second and the third reactors 104 and 106 are connected in parallel to carry out the production or conversion process continuously. In another embodiment, the first reactor 102 is operated until catalyst is deactivated by coke. At the same time, deactivated catalyst in the second reactor 104 is regenerated by steam. The third reactor 106 with regenerated catalyst is ready to use. In FIG. 1, the first, second, and third reactors 102, 104, and 106, respectively are shown for illustrative purpose only and any suitable number of reactors may be included.

In yet another embodiment, if the catalyst bed in the first reactor 102 is a fluidized catalyst bed, deactivated catalyst in the first reactor 102 can be transferred to a regeneration reactor. The transfer of the catalyst may occur by a variety of techniques known in the art, such as vacuum unloading, wet unloading, extraction in inert atmosphere, and the like. The regenerated catalyst is then transferred back to the first or conversion reactor 102 from the regeneration reactor.

Figure 2:
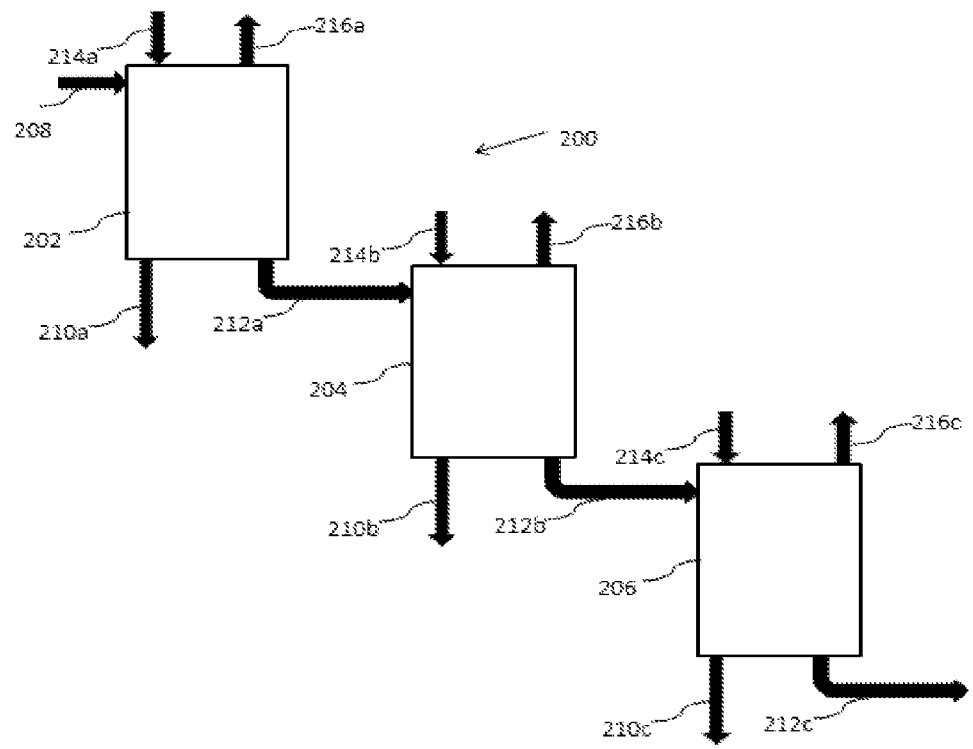
FIG. 2 represents a schematic illustration of multi-stage process for regeneration of the oxidative dehydrogenation (OXO-D) catalyst.

The multi-stage process 200 for regeneration of the oxidative dehydrogenation (OXO-D) catalyst is shown in FIG. 2. In FIG. 2, the multi-stage process includes first, second, and third reactors 202, 204, and 206, respectively. Each of the first, second, and third reactors 102, 104, and 106, respectively contain at least one layer of catalyst bed. In an embodiment, each of the reactors contain multiple layers of catalyst bed, where each layer of catalyst bed may contain a unique catalyst. When a reactor is used for catalyst regeneration, all catalysts present on the bed may be regenerated collectively. In an embodiment, the reactors are connected and operated in series. Further, each are used as either a conversion (or reaction) reactor(s) or a regeneration reactor. The first reactor 202 has a reactant stream 208. The first, second and third reactors 202, 204, and 206 have product streams 210a, 210b, and 210c, unreacted streams 212a, 212b, and 212c, gaseous streams 214a, 214b, and 214c, and vent-outs 216a, 216b, and 216c, respectively. In a preferred embodiment, two of the reactors are online and one is offline at all times.

In an example, the first and second reactors 202 and 204, are online and the third reactor 206 is offline. Here, the first and second reactors 202 and 204, are conversion reactors and the third reactor 206 is a regeneration reactor. The first and second reactors 202 and 204, respectively are operated until the OXO-D catalyst in each of them is deactivated by carbonaceous compounds. Concurrently (or at the same time as the conversion reactors are operational), catalyst in the third reactor 206 is regenerated.

Further, reactants such as n-butene are fed into the first reactor 202 through the reactant stream 208 to undergo OXO-D reaction to form butadienes. The formed butadienes are extracted from the first reactor 202 through the product stream 210a, while the unreacted n-butenes are transferred to the second reactor 204 through the unreacted stream 212a. The unreacted n-butenes undergoes OXO-D reaction in the second reactor 204 to form butadienes, which are extracted through the product stream 210b. Further, in the third reactor 206, herein the regeneration reactor, the spent catalyst is regenerated by a stream of oxygen-containing gaseous mixture. The stream of oxygen-containing gaseous mixture is passed into the third reactor 206 through the gaseous stream 214c. The oxygen reacts with a layer of the carbonaceous compounds to release carbon dioxide ($CO_2$) gas, which is vented out through the vent-out stream 216c. The retrieved $CO_2$ gas is used in the analysis of complete burn-out of the catalyst. In another embodiment, the vent-out stream 216c may be used to vent other excess gases such as steam, $O_2$, hydrocarbons, hydrogen, natural gases and the like. The regenerated catalyst in the third reactor 206 is retained and reused.

Subsequently, one of the first reactor 202 or second reactor 204 becomes offline and the third reactor 206 becomes online. Therefore, a continuous operation is achieved by the use of the first, second, and third reactors 202, 204, and 206, respectively.

The regeneration reactor may be utilized or installed in an existing production plant for regeneration of catalyst. The regeneration reactor enables smooth production of butadienes (i.e., do not need to be shut down on production during catalyst regeneration) and also enhances efficiency of the production plant. Further, the regeneration reactor handles the steam, air, oxygen content in the effluent, and generally avoids damage to the catalyst due to heat generated by burning off the coke. Moreover, the present invention provides a method for regenerating a catalyst if there is no availability of new catalyst. It is preferred to have a spare reactor for this regeneration process, and avoid the problems mentioned above.

It has been found that the steam:air mixture, temperature, and time parameters are important to the regeneration process, provided they are introduced in a controlled fashion. Air herein is defined to mean, and are interchangeable, natural air, oxygen containing air, oxygen enriched air, or air with other natural gases. Too much air with insufficient steam generally results in a runaway regeneration process and ultimately results in loss of catalyst. If the regeneration reaction contains an abundance of steam, it is important to put in air in a controlled fashion to equalize the two components. The addition of air and steam is done to ensure temperatures of about 1100° F., where the temperature of top catalyst bed is about 650° F. and the temperature of bottom catalyst bed is in range of 650-1100° F. It is preferable to keep the temperature in the range of 600-1300° F., more preferably below 1300° F. The regulation of steam:air mixture maintains the ferrite structure. The monitoring of the zinc band at '½' bandwidth is important to ensure the regeneration reaction is not over heated. If an overheating begins to occur, more ferrite is made and can be observed on an x-ray crystallography of the regenerated catalyst. One can also observe the hematite to ensure a balance of iron and ferrite is reached. The steam to air ratio is preferably less than 20 moles, and more preferably less than 10 moles, or it can also be controlled to be about preferably 5-10 percent. After start-up of the reaction, it is recommended to decrease the steam to air ratio to keep the temperature constant. It is important to keep temperature constant, or as much as possible during the reaction, and any changes to the reaction occur slow. The air can also be a mixture of air with an oxygen containing stream or can be enriched oxygen as an example, air with a nitrogen (N2) mix or air and other natural gas mixes. The reaction temperature can be raised by adjusting steam rate at no more than about 10 MT/hour (metric ton per hour). The zinc can be monitored while removal of carbonaceous compounds are occurring and the addition of air and steam is controlled to ensure temperatures of about 594° C. (1100° F.).

Figure 3:
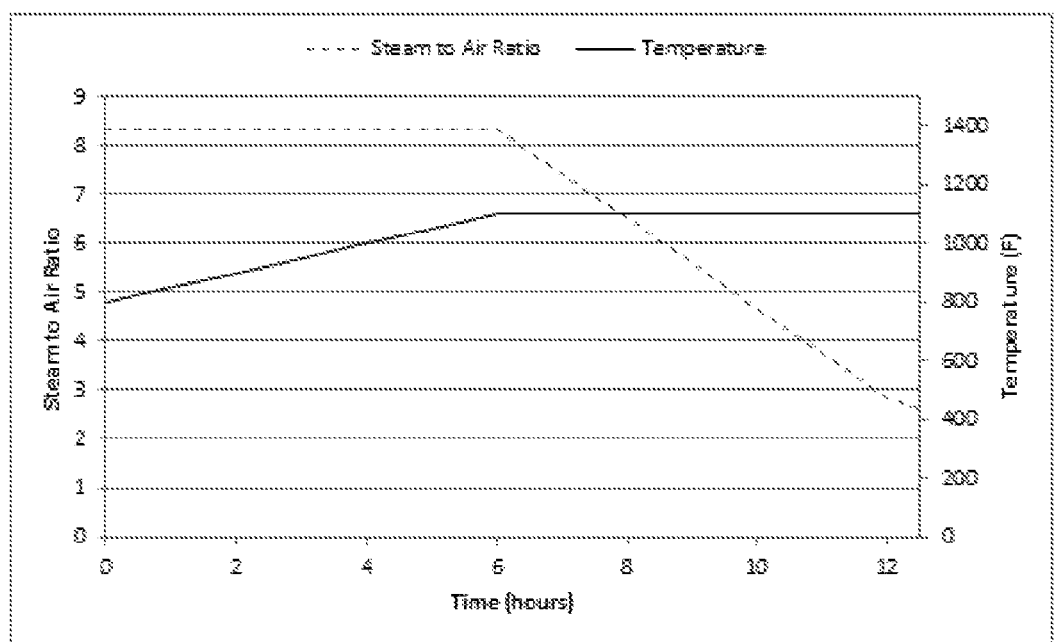
FIG. 3 represents a graph of steam to air ratio and temperature against time for regeneration process of the oxidative dehydrogenation (OXO-D) catalyst.

FIG. 3 illustrates a graph of steam to air ratio and temperature against time. In the graph, dashed line indicates variation of steam to air ratio with time and the solid line indicates variation of temperature with time. Further, the slope of the dashed and solid lines indicates that the stream to air ratio should be maintained at approximately 6.5 to about 8 hours at about 1100° F. to avoid melting of catalyst, runaway reaction and/or hot spots. Steam and air are maintained in the regeneration reactor for about 6 hours to raise the temperature to 1100° F. Steam is then reduced to maintain the amount of air constant to avoid increase in temperature above 1100° F. In an example, 150000 lb/hr of steam along with 18000 lb/hr of air is passed over the catalyst for about 6 hours and the temperature of the catalyst rises to about 1100° F.

In an example, the feedstock used is 1-butene or 2-butene or any combination thereof. The feedstock undergoes the OXO-D reaction using the ferrite catalyst. The conversion rate range is about 60-75% and the selectivity range is about 92-94% using ferrite catalyst. The reactor is adiabatic with temperatures ranging from about 340-650° C. and pressure ranges between about 0-150 pounds per square inch gauge (psig). The gas mixture includes fuel rich with $O_2$ to HC ratio: 0.55 (0.2-1), Steam to HC ratio: 12 (10-15) and LHSV (by HC): 2 (0-4). The conditions in the regeneration reactor are maintained until the entire catalyst is burned off. The lifetime of the ferrite catalyst is known to be about 6 months at a minimum. The reaction of the gas mixture results in formation of $CO_2$ and other byproducts. The selectivity of $CO_2$ ranges between 5-7%. The formed by-products that are not treated have total selectivity of <1% including acetaldehyde, acetone, furan, formaldehyde and vinyl acetylene. The formed by-products can be used for treatment of aldehyde scrubbing of light boiling materials. If isobutylene is used as a feedstock, it converts to $CO_2$ and one of methyl tert-butyl ether (MTBE) or isooctane.

Example

A spent catalyst from butene OXO-D reaction is regenerated in a in-situ regeneration reactor, which is maintained at about 800° F. A stream of steam is passed over the catalyst bed at approximately 100 MT/hr (metric tons per hour) to atmosphere to enable combustion of the coke. The combustion of coke liberates $CO_2$ gas which is then vented out. $CO_2$ is monitored from the regeneration reactor bed. As the $CO_2$ peaks, air is slowly introduced through a bypass pipe until reaching a discharge pressure of about 5 psig is in the unit. It was found, if more air is needed, the chain block valve can be closed to build more discharge pressure, thereby increasing the flow as needed. The process is continued until the complete burn off of coke is observed, as shown on Gas Chromatography (GC). If at any time the temperature range exceeds 1100° F., the air is cut off until the reactor or regeneration reaction hot spots decrease or the reactor temperature reaches 1000° F. During the process, it is important that the temperature does not exceed 1100° F. As the maximum temperature begins to drop, the steam is slowly removed in increments of about 10 MT/hr until a minimum of 50 MT/hr is left in the unit. At this stage, the burn-off is considered to be complete and the reactivated catalyst is reused in OXO-D reaction process. After the burn off is complete, air was removed and the reactor was prepared for reduction of the catalyst.

An advantage of using the inventive regeneration technique is that it helps in avoiding the cycling efforts and time-required to re-equilibrate the conversion reactor and therefore allows efficient use of the conversion reactor. The lifetime of the catalyst is enhanced by carrying out the regeneration at controlled heating over a slow period of time. The process achieves less loading of catalyst and also reduces downtime cost. The process of regeneration prevents the necessity of cooling down or heating up reactors and also increases on stream time.

The process of regeneration allows keeping the peak temperature to where it does not damage the catalyst, as displayed by X-ray powder diffraction (XRD). The multistage process with an additional reactor provides an opportunity to regenerate catalyst off-line thereby reducing non-production time for the product of choice. More than one catalyst per reactor can be employed. Further, the amount of catalyst, type of catalyst, and number of catalysts are up to the user. The longer mean times use of catalyst between entries of the reactors maximizes production runs for a catalyst. The inventive regeneration process also reduces catalyst disposal volume/cost.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention.

What is claimed is:
1. A process for regenerating an iron-based spent oxidative dehydrogenation catalyst in a fixed bed reactor, the process comprising:
   passing a stream containing steam and air in a controlled fashion, together with an oxygen-containing gaseous mixture having $O_2$ to HC ratio is in the range of 0.2-1, and the steam to HC ratio is in the range of 10-15 over a spent iron-based oxidative dehydrogenation catalyst containing carbonaceous compounds in the fixed bed reactor; wherein the steam to air ratio is less than 20 moles; and,
   heating the carbonaceous compounds deposited on the spent iron-based oxidative dehydrogenation catalyst at a pressure of 0-150 psig and a temperature less than 705° C., (1300° F.), wherein the temperature is maintained substantially constant for a period less than 144 hours (6 days) in the fixed bed reactor, and thereby regenerating the spent iron-based oxidative dehydrogenation catalyst in the fixed bed reactor.

2. The process of claim 1 wherein the $O_2$ to HC ratio is 0.55 and the steam to HC ratio is 12.

3. The process of claim 1 wherein the steam to air ratio is less than 10 moles.

4. The process of claim 1 wherein the temperature in the range of 340-650° C.

5. The process of claim 1 wherein the reaction temperature is raised by adjusting steam rate at no more than about 10 MT/hour.

6. The process of claim 1, wherein the iron-based oxidative dehydrogenation catalyst is a composite of iron-based oxide and zinc.

7. The process of claim 4 wherein zinc is monitored while removal of carbonaceous compounds are occurring and the addition of air and steam is controlled to ensure temperatures of about 594° C. (1100° F.).

8. The process of claim 4 wherein a top layer and a bottom layer of catalyst are present and the temperature of the top catalyst bed is about 345° C. (650° F.) and the temperature of the bottom catalyst bed is in range of about 345-595° C. (650-1100° F.).

9. The process of claim 6 wherein the reaction is continued until a balance is substantially reached between the iron and ferrite content of the catalyst.

10. The process of claim 1, wherein the iron-based oxidative dehydrogenation catalyst is free of zinc.

11. The process of claim 1, wherein the carbonaceous compound is at least one of coke, charcoal, and soot.

12. The process of claim 1, wherein the oxygen-containing gaseous mixture is a combination of oxygen and at least one of steam, hydrocarbons, hydrogen, nitrogen and natural gases.

13. The process of claim 1 wherein the stream of steam and air is an oxygen enriched gas mixture having a combination of steam, air, oxygen, hydrocarbons, nitrogen and natural gases.

14. A process for regenerating an iron based oxidative dehydrogenation catalyst using multiple reactors, the process comprising:

allowing oxidative dehydrogenation reaction for conversion of butene to butadiene in first and second reactors; and regenerating spent iron-based oxidative dehydrogenation catalyst in a third reactor, wherein steps for regenerating the spent iron-based oxidative dehydrogenation catalyst comprise:

passing a stream containing steam:air in a controlled fashion, together with an oxygen-containing gaseous mixture over the spent iron-based oxidative dehydrogenation catalyst; and, heating a carbonaceous compound deposited on the spent iron-based oxidative dehydrogenation catalyst at a pressure of 0-150 psig and a temperature less than 705° C. (1300° F.), for a period less than 144 hours (6 days), and thereby regenerating the spent oxidative dehydrogenation catalyst in the third reactor;

and, wherein the first and second reactors are online when the third reactor is offline, thereby regenerating the iron based oxidative dehydrogenation catalyst in the third reactor.

15. The process of claim 14, wherein the first, second, and third reactors are at least one of fixed and fluidized beds.

16. The process of claim 14, wherein the online is operation condition and the offline is non-operation condition of the first, second, and third reactors.

17. The process of claim 14, wherein the iron-based oxidative dehydrogenation catalyst is a composite of iron-based oxide and zinc.

18. The process of claim 14, wherein the iron-based oxidative dehydrogenation catalyst is free of zinc.

19. The process of claim 14, wherein the carbonaceous compound is at least one of coke, charcoal, and soot.

20. The process of claim 14, wherein the oxygen-containing gaseous mixture is a combination of oxygen and at least one of steam, hydrocarbons, hydrogen, and natural gases.

* * * * *